Dec. 11, 1934.                    T. H. RYAN                    1,983,641
                          POWER TRANSMISSION DEVICE
                    Filed July 11, 1933        6 Sheets-Sheet 1

INVENTOR
Thomas H. Ryan.
BY
Wm. H. Atkinson
ATTORNEY.

Dec. 11, 1934.   T. H. RYAN   1,983,641
POWER TRANSMISSION DEVICE
Filed July 11, 1933   6 Sheets-Sheet 2

INVENTOR
Thomas H. Ryan.
BY
ATTORNEY.

Dec. 11, 1934. T. H. RYAN 1,983,641
POWER TRANSMISSION DEVICE
Filed July 11, 1933 6 Sheets-Sheet 6

Fig. 14.

INVENTOR
Thomas H. Ryan.
BY
ATTORNEY.

Patented Dec. 11, 1934

1,983,641

UNITED STATES PATENT OFFICE 1,983,641

POWER TRANSMISSION DEVICE

Thomas H. Ryan, San Francisco, Calif.

Application July 11, 1933, Serial No. 679,904

11 Claims. (Cl. 74—64)

The present invention relates to a power transmission device and more particularly to a gearless power transmitting mechanism which, when interposed between a driving and a driven shaft, will automatically provide for a speed reduction between the shafts that is dependent upon the load carried by the driven shaft and the speed of the driving shaft.

An object of the invention is to provide a transmission device for interposition between an internal combustion engine and the driving shaft of an automobile which will automatically provide for a smooth and efficient acceleration of the automobile without the use of gears and without overloading the engine.

Another object of the invention is to provide a gearless transmission device for obtaining a speed reduction between a driving and a driven shaft which is dependent upon the speed of the driving shaft and the load upon the driven shaft.

A further object of the invention is to provide a power transmission device having a plurality of floating crank shafts that operate upon interconnecting members to produce a variable leverage system, through which driving forces are transmitted from a driving shaft to a driven shaft.

Other objects and advantages of the invention will be in part pointed out hereinafter and in part evident as the description thereof proceeds.

For a better understanding of the invention reference should be had to the accompanying drawings in which.

As illustrated in Figures 1 to 4 of the drawings, the transmission device is designed to be connected in line with and between a driving shaft 10 and a driven shaft 11. In its preferred form the device consists of a cylindrical member 12 having end plates 13 and 14 respectively at the driving and driven ends thereof, between which there is arranged, side by side, a plurality of plate like members having a number of crank shafts extending therethrough which form a variable leverage producing mechanism that will now be described in detail.

Figures 5, 6, 7, 8:
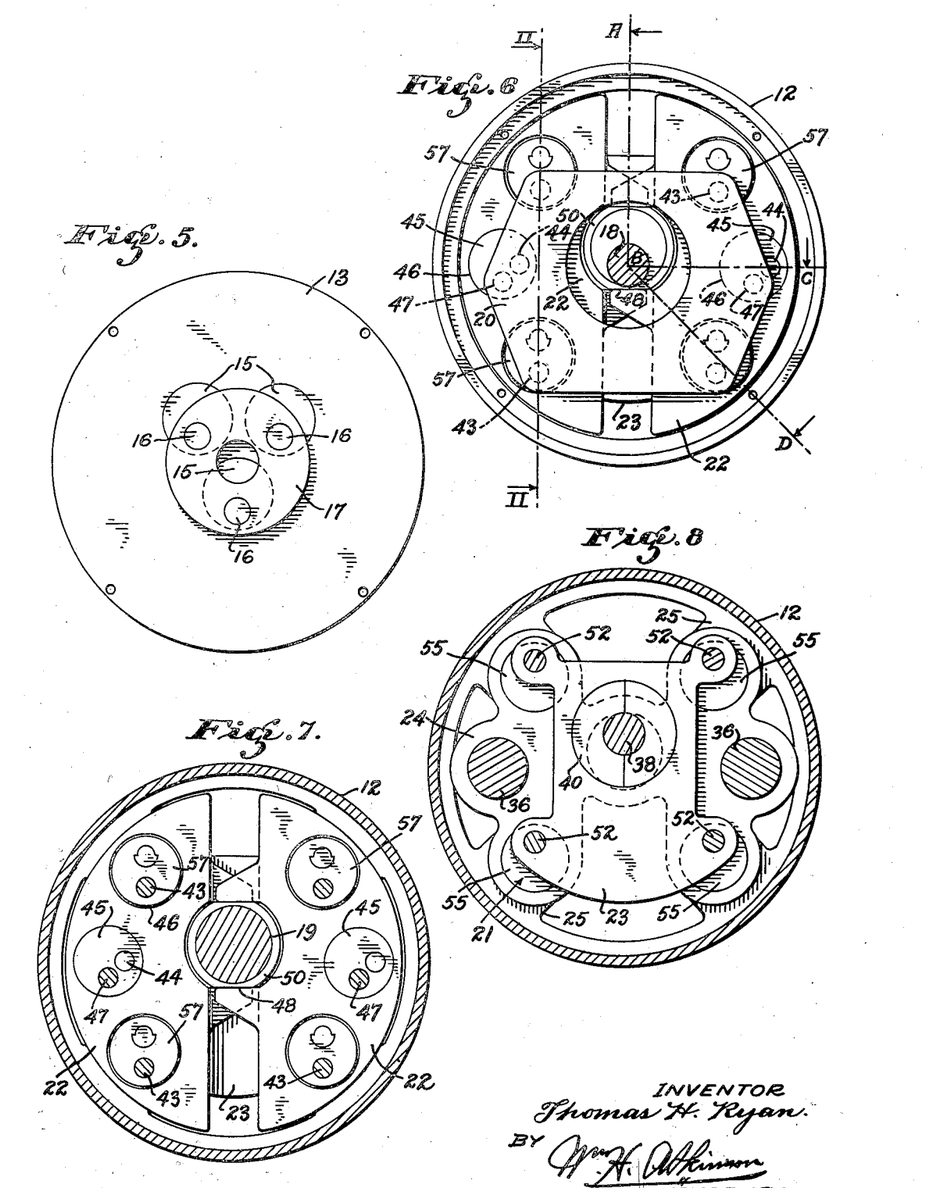
Figure 5 is a view in elevation showing the inside of the driving end of a housing which forms a part of the transmission device.
Figure 6 is a sectional view taken along line VI—VI of Figure 1 looking in the direction of the arrows.
Figure 7 is a sectional view taken along line VII—VII of Figure 1 looking in the direction of the arrows.
Figure 8 is a sectional view taken along line VIII—VIII of Figure 1 looking in the direction of the arrows.

The various plate like members of this mechanism will be identified and described briefly in the order in which they are arranged, proceeding from right to left from the driving shaft 10 to the driven shaft 11. As shown in Figure 5 of the drawings, the end plate 13 has three eccentrically disposed recesses, in each of which there is disposed a disc member 15 having a crank pin 16 that projects out beyond the inner surface of the end plate 13. Mounted upon the crank pins 16 carried by the discs 15 there is a disc member 17 having a central opening that engages with a crank 18 upon, what will be hereinafter referred to as, a main crank shaft 19. Next to the disc member 17 there is provided, as shown in Figure 6, a shaft connecting plate 20 which operates to maintain a number of auxiliary crank shafts 21, to be hereinafter described, in proper cooperating relation with each other and with the main crank shaft 19. Next, proceeding to the left in Figure 1, there is provided a pair of opposed centrifugal weights 22 which operate between the shaft connecting plate 20 and a balance weight 23 that has extremities which connect with crank portions upon the auxiliary shafts 21, as illustrated in Figure 8. Next to the balance weight 23 there is a shaft supporting member 24 and between the shaft supporting member 24 and four inwardly projecting shaft supports 25, carried by the cylindrical member 12, there is provided a crank connecting member 26.

Figures 9, 10, 11, 12:
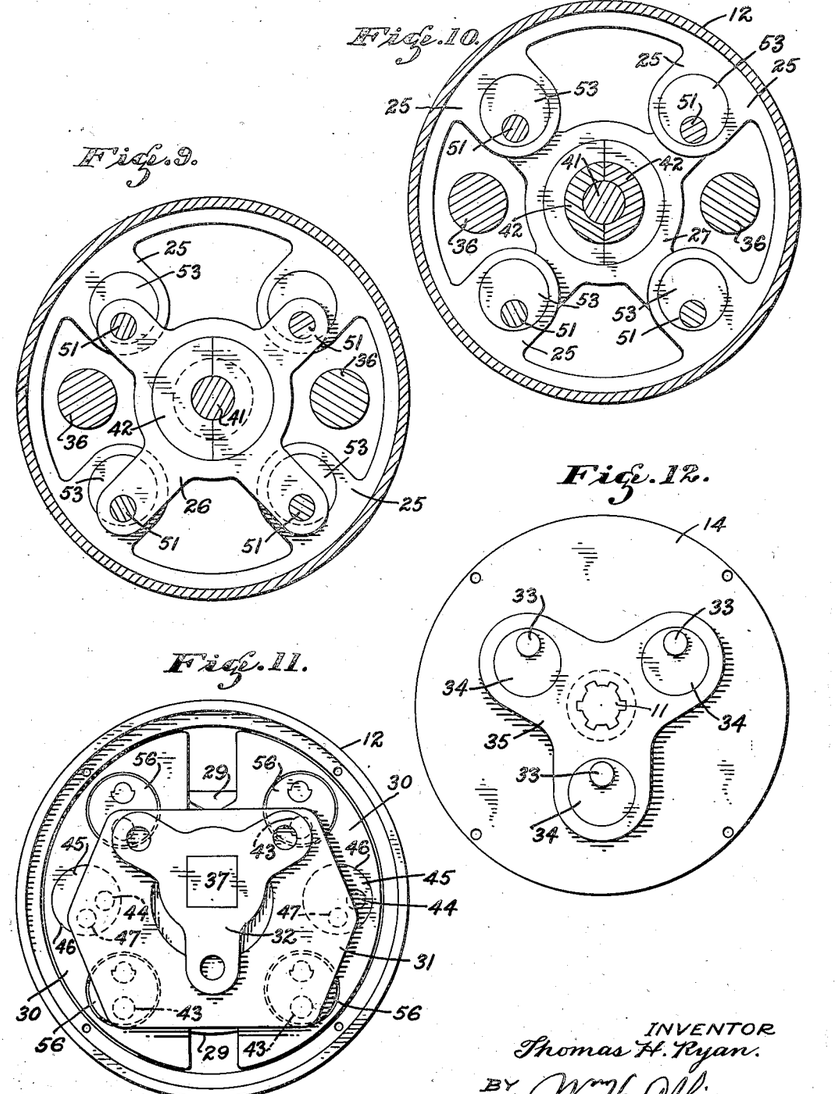
Figure 9 is a sectional view taken along line IX—IX of Figure 1 looking in the direction of the arrows.
Figure 10 is a sectional view taken along line X—X of Figure 1 looking in the direction of the arrows.
Figure 11 is an end view taken along line XI—XI with the end plate and driven shaft removed.
Figure 12 is a view in elevation of the inside of the cover at the driven end of the improved device showing the shaft engaging cranks.

Symmetrically arranged at the left of the inwardly projecting shaft supports 25 upon the cylindrical member 12, there are, a crank connecting member 27, a shaft supporting member 28, a balance weight 29, a pair of opposed centrifugal weights 30 and a shaft connecting plate 31. Each of these last five members is respectively identical with the members 26, 25, 24, 22 and 20, previously described. At the left of the shaft connecting plate 31 there is, as shown in Figure 11, a crank pin connecting plate 32 having arms which engage crank pins 33 formed upon three discs 34 carried by a flanged bushing 35. The flanged bushing 35 is journaled in the end plate 14 and is splined to the driven shaft 11, as shown in Figures 1 and 12.

For controlling the relative movements of the members 15 to 35 inclusive, referred to above as disposed within the cylindrical member 12 and between the end plates 13 and 14, there are, in addition to the main crank shaft 19 and the four auxiliary crank shafts 21, two balancing shafts 36. The auxiliary crank shafts 21 extend parallel with the main crank shaft 19 and are connected with the cylindrical member 12 at equally spaced points by the inwardly projecting shaft supports 25. The balancing shafts 36 are disposed on opposite sides of the main crank shaft 19, between and parallel with the adjacent auxiliary crank shafts 21, and are held in this position by the shaft supporting members 24 and 28.

Figure 1:
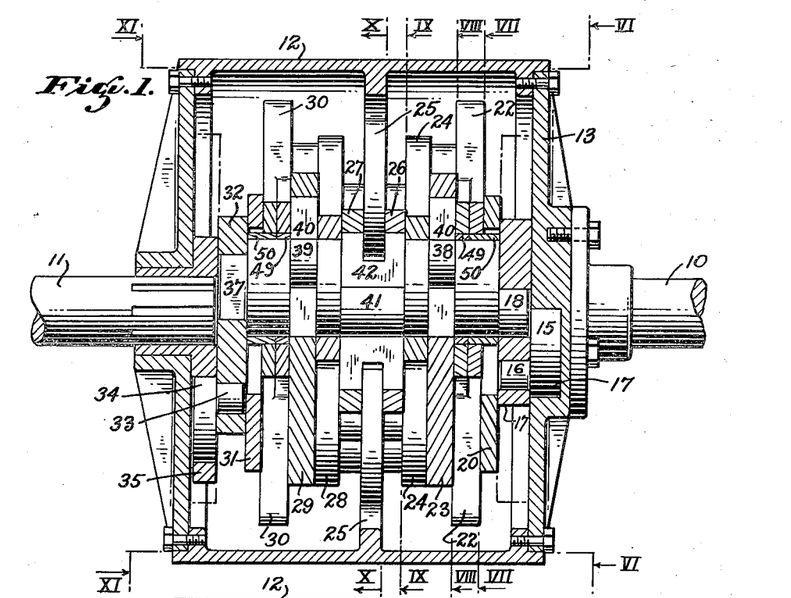
Figure 1 is a vertical sectional view taken through the center of a preferred form of my device.

As illustrated in Figure 1, the main crank shaft 19 has a centrally disposed squared extension 37 at its power delivery end, upon which the crank pin connecting plate 32 is mounted. In addition to this squared extension 37 and the crank 18 upon its other end, the main crank shaft 19 also has two crank portions 38 and 39 and a central crank portion 40. The crank portions 38 and 39 engage bushings 41 carried by the balance weights 23 and 29, as shown in Figure 8, and the central crank portion 40 carries a split spool like bushing 42, the flanges of which engage the crank connecting members 26 and 27, as shown in Figures 9 and 10.

Figure 2:
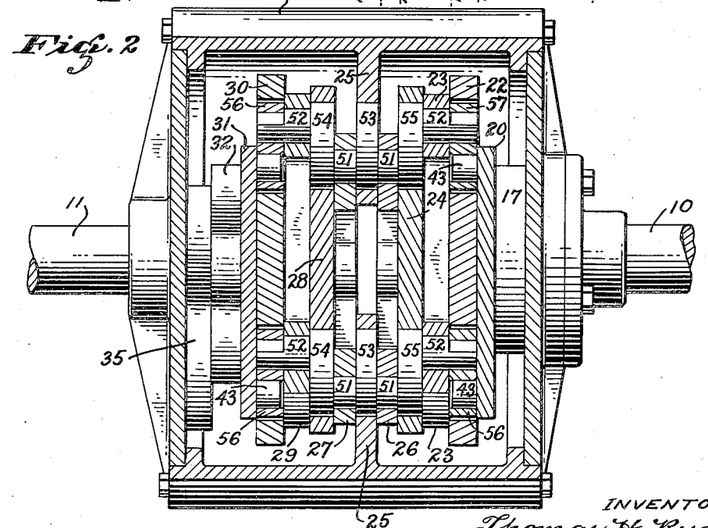
Figure 2 is a tangential sectional view taken along line II—II of Figure 6 looking in the direction of the arrows.

Upon referring to Figure 2, it will be seen that the auxiliary crank shafts 21 are eccentrically connected at their ends to pins 43 carried by the shaft connecting plates 20 and 31. It should also be noted at this time that the auxiliary crank shafts 21 extend through the centrifugal weights 22 and 30 without engaging same and therefore do not interfere with the exertion of the centrifugal force required of these weights when the mechanism is in operation. This figure of the drawings also shows the shaft supporting members 24 and 28 as journaled concentrically upon the auxiliary shafts 21, so that they will support the balancing shafts 36 in proper fixed positions with respect to the auxiliary shafts 21 and the cylindrical member 12.

Figure 3:
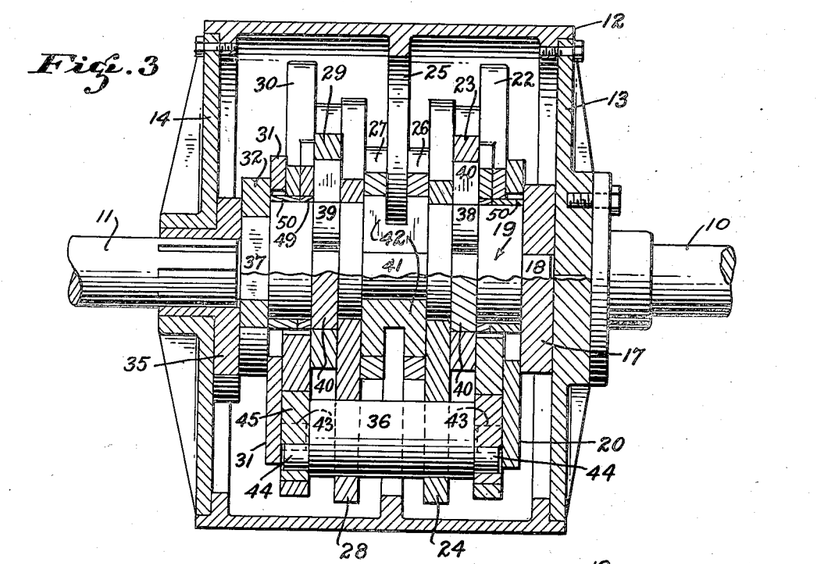
Figure 3 is a developed sectional view taken along line A, B, C, of Figure 6 looking in the direction of the arrows.

In Figure 3, it will be seen that each of the balancing shafts 36 has aligned crank pins 44 which eccentrically engage discs 45 journaled in openings 46 provided in the centrifugal weights 22 and 30. The discs 45 are also eccentrically connected to oppositely disposed pins 47 carried by the shaft connecting plates 20 and 31. With this arrangement the centrifugal weights 22 and 30 are adapted to exert an outward pressure upon the discs 45 which will be determined by their speed of rotation about the axis of the driving shaft 10. Since the weights 22 and 30 are formed in two parts, that have no other connection with each other than through the respective plates 20 and 31 and the discs 45, they are provided with overlapping projections 48 which engage sleeves 49 and 50 upon the shaft 19. The latter one of these sleeves, as illustrated in Figure 1, is long enough to extend through large central openings in the shaft connecting plates 20 and 31 and engage the member 17 or the member 32, depending upon which end of the device is being considered.

Figure 13:
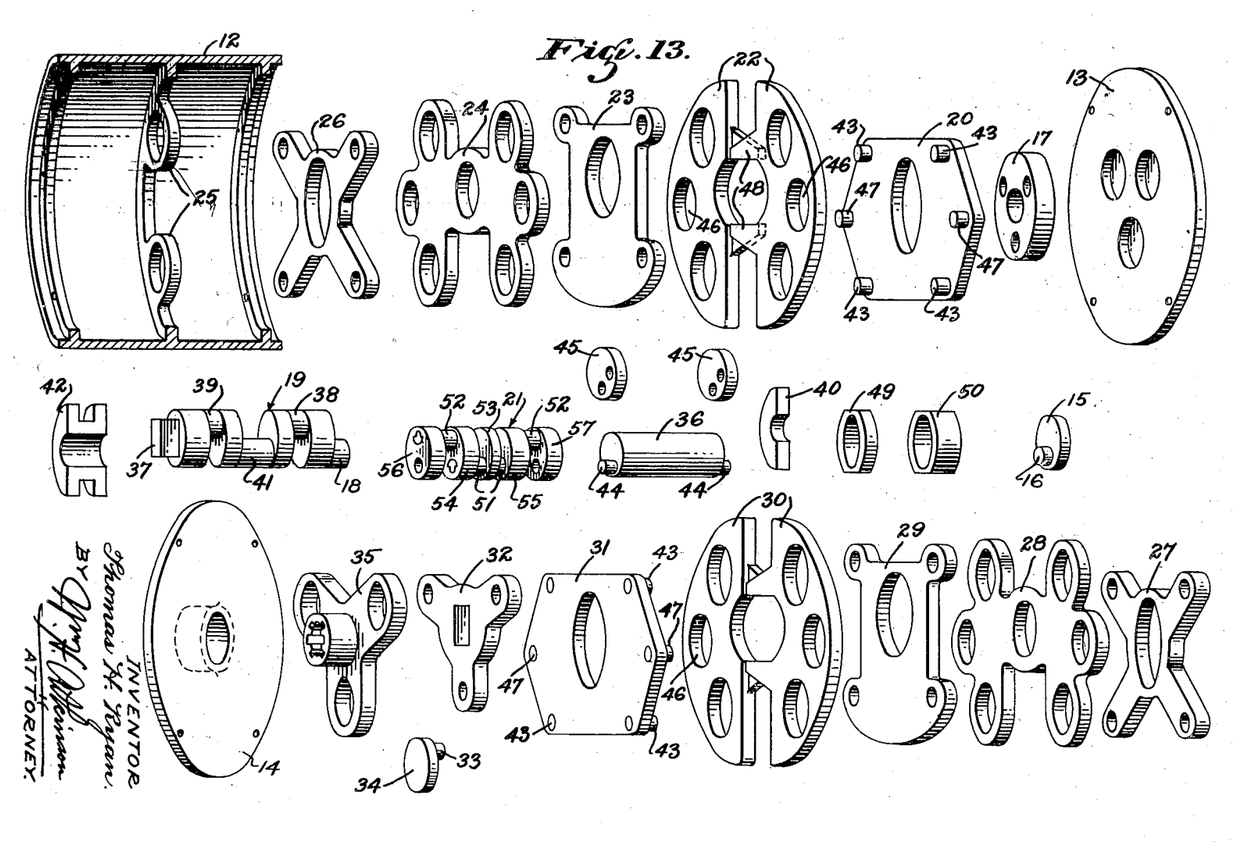
Figure 13 is an exploded view showing details of the parts embodied in the present device.

In Figure 13, the various parts of the device are illustrated in perspective to facilitate a better understanding of the details of construction previously described. Upon an inspection of this figure of the drawings, it will be seen that, except for the eccentric disposition of the central opening, each of the flat transversely disposed members, exclusive of the members 23 and 29, is symmetrical in outline with respect to both the vertical and horizontal axes. The members 23 and 29 move with the cranks upon the shaft 19 and the shafts 21 and therefore they are made unsymmetrical with respect to their horizontal axes to provide a counterbalancing weight to compensate for the unbalanced or off-center disposition of the main crank shaft 19 with relation to the driving and driven shafts 10 and 11.

In order to conveniently assemble the parts upon the crank shafts 19 and 21, special provisions must be made for connecting the different members to the crank portions of these shafts. This is accomplished with the main crank shaft 19, by the split bushings 41 that engage the crank portions 38 and 39 and the spool like bushing 42 which engages the crank portion 40.

The use of bushings in the above manner with the auxiliary shafts 21 is impractical, therefore these shafts are made up of a number of separate parts which are splined together.

Figure 4:
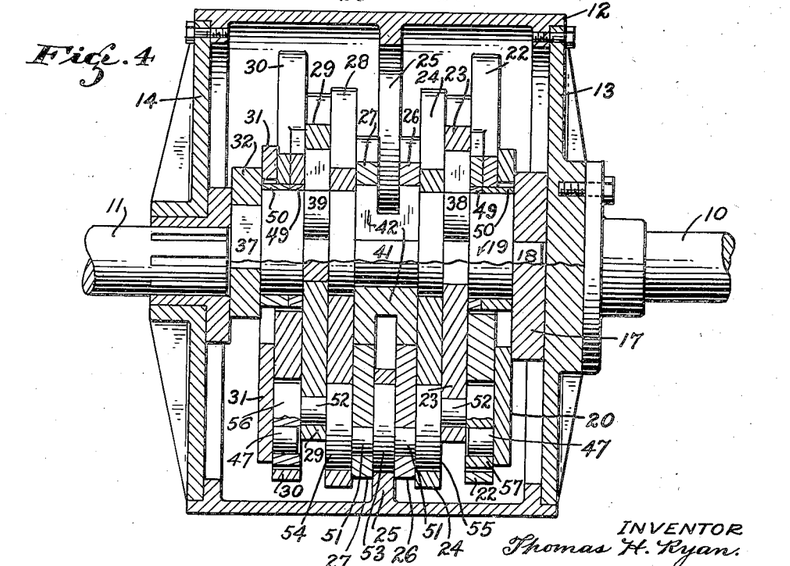
Figure 4 is a developed sectional view taken along line A, B, D, of Figure 6 looking in the direction of the arrows.

As shown in Figures 2, 4, and 13, the shafts 21 have two intermediate crank portions 51 and two outer crank portions 52 which are disposed within the outer circumference of the shaft, as is also the case in the crank shaft 19. Therefore, the shafts 21 are made so that they can be assembled as the other parts of the mechanism are placed in position. These auxiliary shafts 21 are made up by providing a central member 53 with the oppositely disposed cranks 51, spline connecting other members 54 and 55 which carry the cranks 52 to the ends of the cranks 51, and finally spline connecting end members 56 and 57 to the ends of the cranks 52.

Figure 14:
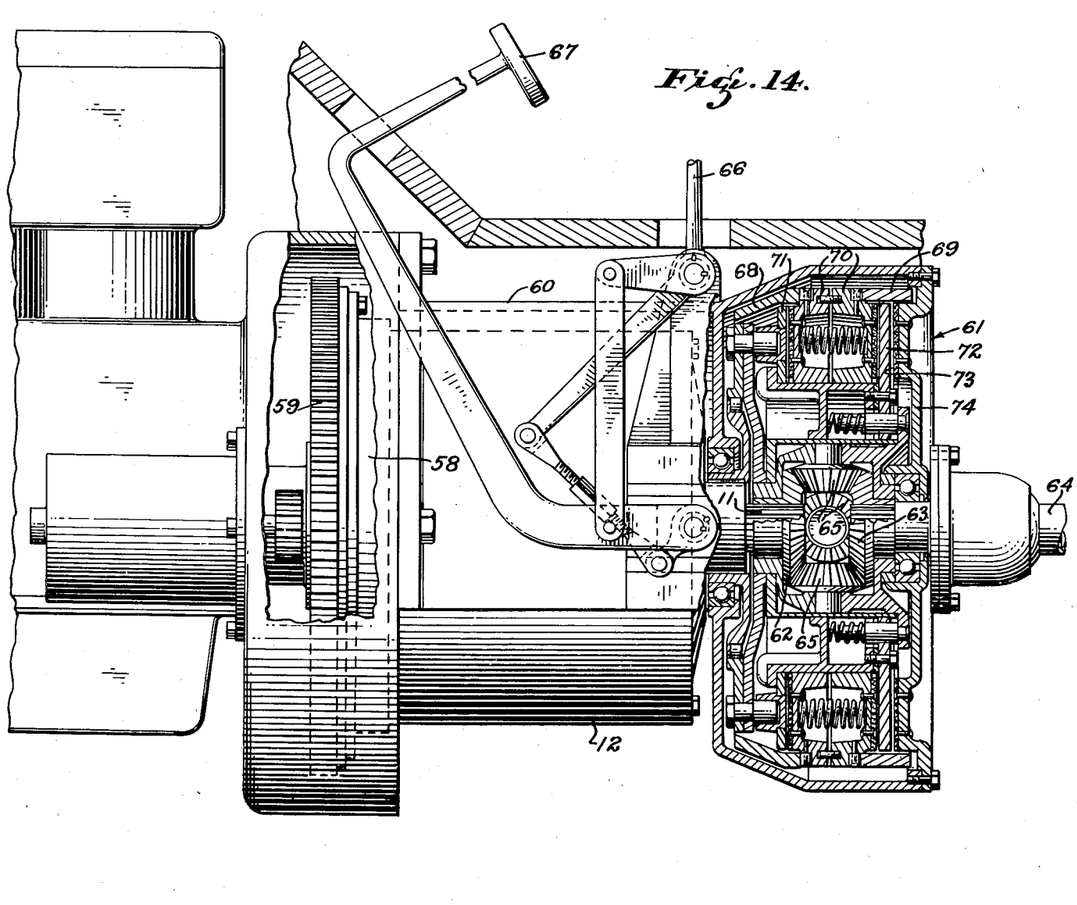
Figure 14 is an assembly showing the manner of mounting the device in an automobile power transmission system.

It is contemplated that the device, illustrated and described above, will be used extensively in automobile transmission systems, therefore in Figure 14 there is shown a suitable arrangement for this purpose. When the device is assembled with an automobile engine it will replace the fly wheel of the engine and eliminate the conventional three speed transmission gears that are now used to obtain an even acceleration of the automobile from the start to full speed. As illustrated in this figure of the drawings, the cylindrical member 12 is provided with a special end flange 58 having starting gear teeth 59 at its rim. A special supporting frame 60 is attached to the engine block to provide a support for the outer end of the transmission device. A reversing and clutch mechanism 61 is also supported at the outer end of the device by the frame 60. The reversing mechanism comprises a beveled gear 62 upon the driven shaft 11, a similar beveled gear 63 upon a drive shaft 64 of the automobile, and a plurality of planetating gears 65 which operate between the gears 62 and 63.

The operation of the reversing and clutch mechanism is adapted to be controlled by a lever 66 located in substantially the same position as the present day conventional gear shift lever. This lever 66 has a neutral position and when it is moved forward or backward from this position it is adapted to control the clutch mechanism so as to provide respectively for a forward or reverse drive of the automobile.

In addition to the lever 66, there is also provided a clutch pedal 67 which, when operated in the conventional manner, will permit a shifting of the lever 66 from one position to another.

The clutch pedal 67, when depressed, operates through a mechanism, not shown, to move opposed rings 68 and 69 of the clutch toward each other to thus compress a two part expansible clutch member 70, and the lever 66 is adapted to control the mechanism associated with the clutch pedal 67 so as to permit an expansion of the member 70 in a particular manner and direction, depending upon whether the lever 66 is in its forward, neutral or reverse position. The expansible clutch member 70 operates between opposed clutch plates 71 and 72 and is free to rotate between the rings 68 and 69. When the clutch member 70 is expanded into engagement with the clutch plates 71 and 72 the lever 66 will be in its forward position and the automobile will be driven forward.

If it is now desired to drive the automobile backward the operator can effect this change by depressing the clutch pedal 67 and moving the lever 66 into its reverse position. When the clutch pedal is released the expansible member 70 will be held out of engagement with the clutch plate 71 and assume a new position, where it will clamp the clutch plate 72 against a stationary friction surface 73 formed upon an end plate 74 carried by the support 60. When the clutch member 72 is thus clamped against the surface 73, the planetating gears 65 will be prevented from rotating with the beveled gear 62 and as a result the beveled gear 63 and the drive shaft 64 will be driven in a reverse direction.

The above description of the reversing mechanism and clutch is believed to be sufficient for an understanding thereof. Inasmuch as the particular clutch structure illustrated forms no part of the present invention, but is to be the subject matter of another application for patent, no further description thereof should be necessary.

Under normal starting conditions the driven shaft 11 will be relieved of its load when the lever 66 is in its neutral position. This will permit a cranking of the engine in accordance with the present day practice. After the engine is started the operator can depress the clutch pedal 67 and place the control lever 66 in its forward or reverse position, depending upon the direction in which it is desired to drive the automobile. As soon as the transmission device is turning over at the idling speed of the engine the operator can release the clutch pedal 67 and thus connect the engine with the automobile drive shaft 64.

After the engine, operating as assumed above at an idling speed, has been connected to the driving shaft 10 the operator can accelerate the automobile by simply speeding up the engine under the control of the gas throttle, as is the present day practice.

In order that the following description of the operation of the device may be fully understood, it is believed that some reference should be made to the dimensions of the apparatus illustrated in the drawings. It is not important what the exact dimensions are, but the eccentric disposition of the cranks and crank pins upon the different shafts and discs must be equal to and correspond with the eccentric disposition of the main crank shaft 19 with respect to the center of the device. In the apparatus shown in the drawings, the main crank shaft 19 is disposed upon an axis extending parallel with and displaced radially one-half inch ($\frac{1}{2}$") from the axis of the driving and driven shafts 10 and 11. This means that the eccentricity of all of the cranks and crank pins must be one-half inch ($\frac{1}{2}$") from the centers about which they move. As shown in the drawings, the axes of all the crank centers extend parallel with each other and while this parallel relation is necessary the auxiliary shafts 21 and the balancing shafts 36 may be located at any convenient distance from the central axis of the device. In the device chosen for illustration, these shafts are located upon centers displaced approximately three inches (3") from the axis of the driving and driven shafts 10 and 11.

The movements and operations of the internal mechanism of the transmission are as follows:

When the engine is running the special end plate 58, shown in Figure 14, or the end plate 13, shown in the other figures of the drawings, will turn with the drive shaft 10. This will cause the cylindrical member 12, with its inwardly projecting shafts 25, to rotate and carry the auxiliary crank shafts 21 slowly about the central axis of the device. As the auxiliary shafts 21 are thus carried about with the cylindrical member 12 they will impart, through the members 24 and 28, a similar movement to the balancing shafts 36. If it is now assumed that the engine is operating at its idling speed and that there are no other than the above parts in the device, it will be readily seen that the central openings, or the main crank shaft 19 engaging portions, of the members 24 and 28 will move in a circle about the axis of the driving and driven shafts 10 and 11. This is due to the eccentricity of these openings with respect to the member 12. It will also be seen that if the main crank shaft 19 with its end connections, i. e., the disc members 15 and 17 which connect with the end plate 13 and the crank pin connecting plate 32 and its connections with the flanged bushing 35, is now added to the above partial assembly, it will gyrate or float freely about the central axis of the device without turning upon its own axis or imparting any rotation to the driven shaft 11. In other words, the cranks of the main crank shaft 19 will remain in the same vertical plane, as shown in Figure 1, throughout the complete revolution of the cylindrical member 12. That this is true, under the conditions assumed, is explained by the fact that the centrally disposed squared extension 37 upon this shaft is held against rotation by the crank pin connecting plate 32 and the crank pins 33. It should be here stated that while the crank pins 33 operate to prevent a turning of the main crank shaft 19 about its axis, they do not interfere with its circular or gyrating movement about the axis of the driving and the driven shafts, as these pins 33 will turn about the axis of the discs 34 and follow a circular path corresponding to that of the main crank shaft 19. At the other or driving end of the main crank shaft 19, the disc 17, because of its eccentrically adjustable connection with the end plate 13 through the crank pins 16 upon the disc members 15, will provide a floating bearing for the crank 18, which will also follow a circular path corresponding in diameter to the path of the main crank shaft 19 but displaced downwardly one-half inch (½″) from the position shown in Figure 1. In other words, as the main crank shaft 19 moves downwardly from the position shown in Figure 1, through an angle of 180 degrees, the end plate 13 will carry the discs 15 around and permit the crank pins 16 to assume new positions which will locate the center of the disc 17 one inch (1″) below the point shown in this figure of the drawings.

During the above movement of the main crank shaft 19 the flanged bushing 15 and the shaft 11 will remain stationary and consequently the crank pin connecting plate 32 will move about the axis of the discs 34 and bring the crank pins 33 into their lowermost positions.

Now if the crank connecting members 26 and 27 and the balance weights 23 and 29 are added to the above described parts, it will be seen, due to the eccentric connection of these members with the main crank shaft 19 and the auxiliary crank shafts 21, that as the main crank shaft gyrates about the axis of the driving shaft 10 the auxiliary crank shafts 21 will be caused to rotate about their axes in a direction opposite to that of the cylindrical member 12. This is explained by the fact that, since the main crank shaft 19 is held against rotation by the load and therefore has relative rotation with respect to the cylindrical member 12, it will carry the crank connecting members 26 and 27 and the balance weights 23 and 29 around in a circular path and, because of the eccentric connection of these members with the auxiliary shafts 21, impart rotation thereto.

Now if the centrifugal weights 22 and 30, the shaft connecting plates 20 and 31 and the discs 45 which connect the centrifugal weights with the balancing shafts 36 are added to the above, to complete the assembly of the device, it will be seen, still assuming an idling speed for the device, that owing to the concentric relation of the discs 45 with respect to the balancing shafts 36 and the eccentric connection of these discs 45 with the shaft connecting plates, that the balancing shafts 36 will also be turned in synchronism with the auxiliary shafts 21.

While it is true that the main crank shaft does not rotate about its own axis, it will be seen that this shaft, as suggested above, will rotate relative to the cylindrical member 12 one revolution in an opposite direction each time the member 12 turns completely around its central axis. This means that the auxiliary shafts 21 and the balancing shafts 36 will also rotate one revolution in an opposite direction each time the device as a whole turns completely over.

Now, assuming that the load upon the driven shaft 11 remains constant, if the operator speeds up the engine by opening the throttle, the speed of the cylindrical member 12 will be increased and because of the load upon the driven shaft 11 the main crank shaft 19 will lag behind or, in other words, slow up and/or attempt to turn about its axis in the same direction as the cylindrical member 12. This lag or slowing up in the relative rotation of the main crank shaft 19, with respect to the rotating cylindrical member 12, will be in turn imparted to the auxiliary shafts 21 and thus change the relative positions of the cranks upon the auxiliary shafts 21 and the cranks upon the main crank shaft 19. At the same time the shaft connecting plates 20 and 31 will be displaced and as a result the discs 45 upon the crank pins 44 of the balancing shafts 36 will be similarly displaced from their initial position. At this point the centrifugal forces exerted by the weights 22 and 30 will come into play and oppose this relative displacement of the shaft cranks and thereby create a force in opposition to the forces tending to hold the main crank shaft 19 against rotation about its axis.

As long as the centrifugal force is insufficient to prevent a relative displacement of the crank shafts, as suggested above, the driven shaft will rotate at a speed less than that of the driving shaft, but as soon as the engine speed is increased sufficiently to provide the necessary additional exertion of centrifugal force by the weights 22 and 30 the main crank shaft 19 will be held stationary or in locked relation with respect to the cylindrical member 12, and as a result the shaft 11 will be driven at the same speed as the driving shaft 10.

In addition to the centrifugal force exerted by the weights 22 and 30, there will also be present the inertia of the crank connecting members 24 and 27 and the counterbalancing weights 22 and 29 which move first in one direction and then in another transversely across the axis of the driving and driven shafts as the crank shafts 19 and 21 rotate. In other words, these inertia forces will have a tendency to also offset the cranks upon the crank shafts 19 and 21 with respect to each other and as a result combine with the centrifugal force exerted by the weights 22 and 30 to effect a locking of the main crank shaft 19 within the cylindrical member 12.

As the above referred to forces operate to displace the cranks upon the main crank shaft 19, the auxiliary crank shafts 21 and the counterbalancing shafts 36, these cranks will assume different radial positions with respect to the axis of the driving and driven shafts and thus, through the medium of the crank connecting members 23, 29 and 26, 27, produce variable lever arms, the outer ends of which will be connected to the cranks 51 and 52 on the auxiliary shafts 21, and the inner ends of which will connect with the cranks 38, 39 and 40 on the main crank shaft 19. The fulcrum about which these lever arms will operate is the central axis of the main crank shaft 19.

As the cranks upon the auxiliary crank shafts 21 and the cranks upon the main crank shaft 19 move with respect to each other the forces exerted by the lever arms will vary from zero to a maximum. For instance, when the automobile engine is idling and the main crank shaft 19 is gyrating about the axis of the driving and driven shafts 10 and 11, the fulcrum provided by the main crank shaft 19 will move around with the cranks upon the auxiliary crank shafts 21 and no torque will be transmitted to the driven shaft 11. However, when the device is operated at a speed sufficient to produce the necessary centrifugal and inertia forces, the main crank shaft 19 will be locked, with respect to the cylindrical member 12, in a position similar to that illustrated in Figure 1. Under these conditions the cranks 52, upon the auxiliary crank shafts 21 disposed above the axis of the device will form, with the members 23 and 29, levers of the so-called "B" class that will exert a turning force upon the cranks 38 and 39 of the main crank shaft 19, and the cranks 52, upon the auxiliary crank shafts 21 below the axis of the device, will exert a driving force upon the same crank portions of the main crank shaft 19 through "A" class levers. The same leverage action will exist between the crank portions 51 upon the auxiliary shafts 21 and the crank 40 upon the main crank shaft 19, both above and below the axis of the device, but the forces exerted by this leverage will be applied to the main crank shaft 19 by a lever different in form than that operated upon by the adjacent crank 52. In other words, a "B" class lever will oppose each "A" class lever and vice versa. When the forces exerted by these opposing "A" and "B" class levers are equal, that is, when the parts are as illustrated in the drawings, the squared end 37 of the main crank shaft 19 will not turn with respect to the cylindrical member 12 and consequently the crank pin connecting plate 32 will be carried around with the cylindrical member 12 and thus rotate the flanged bushing 35 and the driven shaft 11.

After the device is completely assembled the housing, formed by the cylindrical member 12 and the end plates 13 and 14, will be partially filled with lubricating oil and as a result practically no frictional retarding force will be caused by a rubbing between various parts.

While I have, for the sake of clearness and in order to disclose my invention so that the same can be readily understood, described and illustrated specific devices and arrangements, I desire to have it understood that this invention is not limited to the specific means disclosed but may be embodied in other ways that will suggest themselves, in view of this broad disclosure, to persons skilled in the art. It is believed that this invention is broadly new and it is desired to claim it so that all such changes as come within the scope of the appended claims are to be considered as part of this invention.

Having thus described my invention, what I claim and desire to secure by Letters Patent is—

1. In a power transmission device, the combination of a driving shaft, a driven shaft disposed in axial alignment with said driving shaft, a main crank shaft extending between the ends of said driving and driven shafts and located upon an axis displaced radially from the axis of the driving and driven shafts, a cylindrical member carried by the driven shaft and extending over said main crank shaft, a plurality of auxiliary crank shafts disposed around the axis of the driving and driven shafts and extending parallel with said main crank shaft, members forming lever arms between cranks upon said main and auxiliary crank shafts adapted to exert a force tending to prevent relative movement of said main crank shaft within said cylindrical member, an adjustable connection between one end of said main crank shaft and said driven shaft adapted to permit relative movement of said crank shaft with respect to the driven shaft, and means responsive to the speed of the driving shaft cooperating with the cranks upon said auxiliary crank shafts tending to prevent rotation of said main crank shaft, whereby power will be applied to said driven shaft when the speed of the driving shaft exceeds a predetermined value.

2. In a power transmission device, the combination of a driving shaft, a driven shaft disposed in axial alignment with said driving shaft, a main crank shaft extending between the ends of said driving and driven shafts and located upon an axis displaced radially from the axis of said driving and driven shafts, a member carried by the driven shaft extending over said main crank shaft, a plurality of auxiliary crank shafts carried by said member and disposed in spaced relation around the axis of the driving and driven shafts, crank connecting members forming lever arms between cranks upon said main and said auxiliary crank shafts adapted to exert a turning force upon said main crank shaft, an adjustable connection between one end of said main crank shaft and said driven shaft adapted to permit relative movement of said crank shaft with respect to the driven shaft, and means responsive to the speed of the driving shaft cooperating with the cranks upon said auxiliary crank shafts tending to prevent rotation of said main crank shaft, whereby power will be applied to said driven shaft when the speed of the driving shaft exceeds a predetermined value.

3. In a power transmission device, the combination of a driving shaft, a driven shaft disposed in axial alignment with said driving shaft, a crank shaft disposed between the ends of said driving and driven shafts, an adjustable connection between the ends of said crank shaft and the driving and driven shafts adapted to permit said crank shaft to gyrate about the axis of the driving and the driven shafts, and means connected with the driving shaft adapted to prevent relative movement of said crank shaft with respect to the driving and driven shafts, whereby torque will be transmitted through said crank shaft from the driving shaft to the driven shaft when said means is operating.

4. In a power transmission device, the combination of a driving shaft, a driven shaft disposed in axial alignment with said driving shaft, a crank shaft disposed between the ends of said driving and driven shafts, an adjustable connection between the ends of said crank shaft and the driving and the driven shafts adapted to permit said crank shaft to gyrate about the axis of the driving and the driven shafts, and variable lever means driven by the driving shaft adapted to prevent relative movement of said crank shaft with respect to the driving and the driven shafts, whereby torque will be transmitted through said crank shaft from the driving shaft to the driven shaft when said variable lever means is operating.

5. In a power transmission device, the combination of a driving shaft, a driven shaft disposed in axial alignment with said driving shaft, a main crank shaft disposed between the ends of said driving and driven shafts, an adjustable connection between the ends of said main crank shaft and the driving and driven shafts adapted to permit said main crank shaft to gyrate about the axis of the driving and the driven shafts, an end plate secured to and rotatable with said driving shaft, a cylindrical member secured to said end plate and forming a rotating housing about said main crank shaft, a plurality of auxiliary crank shafts mounted upon supports carried by said cylindrical member, crank connecting members mounted upon and connecting the cranks of said main and auxiliary crank shafts, and means for controlling the relative positions of the cranks upon said main and auxiliary crank shafts in response to speed changes in the driving shaft to thereby establish a variable speed driving connection between the driving and driven shafts.

6. In a power transmission device, the combination of a driving shaft, a driven shaft disposed in axial alignment with said driving shaft, a main crank shaft disposed between the ends of said driving and driven shafts, means extending adjacent said main crank shaft and rotatable with said driving shaft, a plurality of auxiliary crank shafts carried by said means and disposed in spaced relation about said main crank shaft, and connections between said auxiliary crank shafts and said main crank shaft tending to lock the main crank shaft against relative movement with respect to the driving and driven shafts, whereby power will be transmitted through said main crank shaft from the driving shaft to the driven shaft.

7. In a power transmission device, the combination of a driving shaft, a driven shaft disposed in axial alignment with said driving shaft, a main crank shaft disposed between the ends of said driving and driven shafts, shaft supporting means extending adjacent said main crank shaft and driven by said driving shaft, a plurality of auxiliary crank shafts carried by said shaft supporting means and disposed in spaced parallel relation about said main crank shaft, lever arms connected between the cranks upon said auxiliary crank shafts and said main crank shaft for establishing a driving connection between said shaft supporting means and the main crank shaft, and means responsive to changes in the speed of the driving shaft for controlling the positions of said lever arms, whereby power will be transmitted from the driving shaft to the driven shaft when the power input of the driving shaft is equal to or in excess of the load upon the driven shaft.

8. In a device of the character described, the combination of a driving shaft, a cylindrical member mounted upon said driving shaft and extending coaxially therewith, a driven shaft journaled at the outer end of said cylindrical member, a plurality of auxiliary crank shafts mounted in spaced relation within said cylindrical member, a main crank shaft having cranks complementary to the cranks upon said auxiliary crank shafts mounted eccentric to the axis of said driving and driven shafts, lever forming links connected between the cranks upon said auxiliary crank shafts and the main crank shaft, means responsive to the speed of said driven shaft adapted to control the relative displacement of the cranks upon said main crank shaft with respect to the axis of the driven shaft, and means providing an adjustable driving connection between said main crank shaft and the driven shaft.

9. In a device of the character described, the combination of a driving shaft, a cylindrical member mounted upon said driving shaft and extending coaxially therewith, a driven shaft journaled at the outer end of said cylindrical member, a plurality of auxiliary crank shafts mounted in spaced relation within said cylindrical member, a main crank shaft having cranks complementary to the cranks upon said auxiliary crank shafts, said main crank shaft being mounted eccentric to the axis of said driving and driven shafts a distance equal to the eccentricity of the cranks upon said auxiliary crank shafts, lever forming links connected between the cranks upon said auxiliary crank shafts and the main crank shaft, means responsive to the speed of said driven shaft adapted to control the relative displacement of the cranks upon said main crank shaft with respect to the axis of the driven shaft, and a driving connection between said main crank shaft and the driven shaft.

10. In a power transmission device, the combination of a driving shaft, a driven shaft disposed in axial alignment with said driving shaft, a main crank shaft extending between the ends of said driving and driven shafts and located upon an axis displaced radially from the axis of said driving and driven shafts, a cylindrical member carried by the driven shaft and extending over said main crank shaft, a plurality of auxiliary crank shafts disposed about the axis of the driving and driven shafts and extending parallel thereto, a pair of counterbalancing shafts mounted in cooperating relation with said main and said auxiliary crank shafts, oppositely disposed centrifugal weights adjustably connected to cranks upon the ends of said counterbalancing shafts, means connected between the ends of all of said auxiliary crank shafts for controlling the adjustable connection between the counterbalancing shafts and the centrifugal weights, whereby the rotation of said auxiliary crank shafts will be retarded as the forces exerted by said centrifugal weights increase and decrease in response to variations in the speed of the driving shaft, means for connecting the cranks of said auxiliary crank shafts to the cranks upon said main crank shaft, and a power transmitting connection between said main crank shaft and the driven shaft for imparting rotation to said driven shaft when the forces exerted by said centrifugal weights are sufficient to prevent rotation of said main and auxiliary crank shafts.

11. In a power transmission device, the combination of a driving shaft, an axially aligned driven shaft, means disposed between the adjacent ends of said driving and driven shafts forming a floating fulcrum, variable lever means operating upon said floating fulcrum, and means connecting said variable lever means to both the driving and driven shafts, whereby a variable torque will be transmitted from the driving shaft to the driven shaft through said variable lever means as the relative speeds of said shafts vary.

THOMAS H. RYAN